US008553091B2

(12) United States Patent
Ishii et al.

(10) Patent No.: US 8,553,091 B2
(45) Date of Patent: *Oct. 8, 2013

(54) IMAGING DEVICE AND METHOD, AND IMAGE PROCESSING METHOD FOR IMAGING DEVICE

(75) Inventors: Yasunori Ishii, Osaka (JP); Yusuke Monobe, Kyoto (JP)

(73) Assignee: Panasonic Corporation, Osaka (JP)

( * ) Notice: Subject to any disclaimer, the term of this patent is extended or adjusted under 35 U.S.C. 154(b) by 10 days.

This patent is subject to a terminal disclaimer.

(21) Appl. No.: 13/260,440

(22) PCT Filed: Jan. 12, 2011

(86) PCT No.: PCT/JP2011/000093
§ 371 (c)(1),
(2), (4) Date: Sep. 26, 2011

(87) PCT Pub. No.: WO2011/096157
PCT Pub. Date: Aug. 11, 2011

(65) Prior Publication Data
US 2012/0026349 A1    Feb. 2, 2012

(30) Foreign Application Priority Data
Feb. 2, 2010  (JP) ................. 2010-021343

(51) Int. Cl.
*H04N 5/228* (2006.01)
*H04N 5/232* (2006.01)
*G06K 9/40* (2006.01)

(52) U.S. Cl.
USPC ............. 348/208.12; 348/345; 382/255

(58) Field of Classification Search
USPC .............. 348/208.99, 208.4, 208.5, 345, 349, 348/208.12, 340, 335; 359/354; 382/255
See application file for complete search history.

(56) References Cited

U.S. PATENT DOCUMENTS 7,256,943 B1 *  8/2007  Kobrin et al. ................. 359/666
8,155,467 B2 *  4/2012  Hiraga et al. ................. 382/255
(Continued)

FOREIGN PATENT DOCUMENTS

JP    2006-129236 A    5/2006
JP    2006-279807 A    10/2006
(Continued)

OTHER PUBLICATIONS

International Search Report for corresponding International Application No. PCT/JP2011/000093 mailed Apr. 12, 2011.
(Continued)

*Primary Examiner* — James M Hannett
*Assistant Examiner* — Ahmed A Berhan
(74) *Attorney, Agent, or Firm* — Renner, Otto, Boisselle & Sklar, LLP

(57) ABSTRACT

An image-capturing device of the present invention includes an image-capturing element 10 including a plurality of light-sensing cells arranged on an image-capturing surface; an optical system (14, 20) for forming a first image which is in focus on an image-capturing surface 10a in a first state and forming a second image which is out of focus on the image-capturing surface 10a in a second state; and an image processing section 220 for processing a signal obtained from the image-capturing element 10. The image processing section 220 includes a camera-shake blur removing section for generating a restored image obtained by reducing camera-shake blur from an image obtained by the image-capturing element 10 in the second state.

5 Claims, 10 Drawing Sheets

(56) References Cited

U.S. PATENT DOCUMENTS

| | | | |
|---|---|---|---|
| 8,249,377 B1 * | 8/2012 | Banner et al. | 382/255 |
| 2006/0093233 A1 * | 5/2006 | Kano et al. | 382/254 |
| 2006/0115926 A1 * | 6/2006 | Wood et al. | 438/106 |
| 2007/0258706 A1 | 11/2007 | Raskar et al. | |
| 2008/0008398 A1 * | 1/2008 | Tanaka et al. | 382/275 |
| 2008/0193026 A1 * | 8/2008 | Horie et al. | 382/238 |
| 2009/0039233 A1 * | 2/2009 | Hiraga et al. | 250/201.8 |
| 2009/0179995 A1 | 7/2009 | Fukumoto et al. | |
| 2010/0053350 A1 | 3/2010 | Miyauchi et al. | |
| 2010/0066812 A1 * | 3/2010 | Kajihara et al. | 348/46 |

FOREIGN PATENT DOCUMENTS

| | | | |
|---|---|---|---|
| JP | 2008-011492 A | 1/2008 | |
| JP | 2008-033060 A | 2/2008 | |
| JP | 2008-058546 A | 3/2008 | |
| JP | 2008-167395 A | 7/2008 | |
| JP | 2009-020844 A | 1/2009 | |
| JP | 2009-522825 T | 6/2009 | |
| JP | 2009-206831 A | 9/2009 | |
| JP | 2009-207118 A | 9/2009 | |
| JP | 2009-244490 A | 10/2009 | |
| JP | 2009-253936 A | 10/2009 | |
| JP | 2009-267523 A | 11/2009 | |

OTHER PUBLICATIONS

PCT/ISA/237 for International Application No. PCT/JP2011/000093 dated Apr. 12, 2011 and Partial English translation.

Co-pending National Phase Application corresponding to International Application No. PCT/JP2011/000380 filed on Jan. 25, 2011 to be filed (application provided).

Shan et al., "High-quality Motion Deblurring from a Single Image", SIGGRAPH 2008 (cited in [0005] of the specification).

Yoneji et al., "PSF Parameter Estimation for Restoration of Linear Motion Blurred Image", IPSJ SIG Technical Report, vol. 2005 No. 38, pp. 47-52, 2005 (cited in [0005] of the specification) (with English abstract).

J. Bioucas-Dias, "Bayesian Wavelet-Based Image Deconvolution: A GEM Algorithm Exploiting a Class of Heavy-Tailed Priors", IEEE Trans. Image Proc., vol. 15, No. 4, pp. 937-951, Apr. 2006 (cited in [0005] of the specification).

Anat Levin, "Blind Motion Deblurring Using Image Statistics", Advances in Neural Information Processing Systems (NIPS), Dec. 2006 (cited in [0005] of the specification).

Fergus et al., "Removing Camera Shake from a Single Photograph", SIGGRAPH, 2006 (cited in [0005] of the specification).

* cited by examiner (a)

(b)

(a)

(b)

(a)

(b)

(a)

*

(b)

⇩

(c)

(a)

(b)

(a)

(b)

IMAGING DEVICE AND METHOD, AND IMAGE PROCESSING METHOD FOR IMAGING DEVICE

TECHNICAL FIELD

This invention relates to an image processing device and an image processing method for removing ringing.

BACKGROUND ART

When an image is captured by a digital camera, noise may be added depending on the characteristics of the CCD (Charge-Coupled Device) or the CMOS read-out circuit or the characteristics of the transfer path. There are also out-of-focus image blur which occurs when the object is not in focus when capturing an image thereof, and image blur which occurs due to camera shake, or the like. Thus, captured images have noise due to characteristics inherent to captured images, as well as blur caused by human operations during the picture-taking operation, thereby deteriorating the images. Of these types of "blur", image blur due to camera movements during picture-taking (exposure) will be referred to as "motion blur", distinguished from out-of-focus blur.

In recent years, as demands for high-sensitivity photography are particularly increased, it is necessary to restore an image which has deteriorated due to blur (hereinafter referred to as a "deteriorated image") to an image that is as close as possible to an original image (hereinafter referred to as an "ideal image". In order to realize a bright image without noise or blur which is required for high-sensitivity photography, there are generally two approaches, i.e., to increase the sensitivity and to elongate the exposure time.

However, increasing the sensitivity also amplifies noise, and the signal is buried under noise, often resulting in an image mostly covered by noise. On the other hand, by elongating the exposure time, it is possible to accumulate more of light present in the scene, thereby obtaining an image with little noise. In this case, the signal is not buried under noise, but the image may have motion blur due to camera shake.

In view of this, countermeasures are taken conventionally by two approaches in cases in which the exposure time is elongated. One is optical camera shake correction such as lens shift or sensor shift. The other is a method (a restoration method by signal processing) of obtaining the direction/magnitude of motion blur from an obtained image so as to restore the image by signal processing from the direction/magnitude of motion blur. Restoration methods by signal processing are disclosed in, for example, Patent Document No. 1, Patent Document No. 2, and Non-Patent Documents Nos. 1-5.

CITATION LIST

Patent Literature

Patent Document No. 1: Japanese Laid-Open Patent Publication No. 2006-129236
Patent Document No. 2: Japanese National Phase PCT Laid-Open Publication No. 2009-522825

Non-Patent Literature

Non-Patent Document No. 1: Qi Shan, Jiaya Jia, and Aseem Agarwala, "High-quality Motion Deblurring from a Single Image", SIGGRAPH 2008
Non-Patent Document No. 2: Yoneji, Tanaka, and Okutomi, "PSF Parameter Estimation for Restoration of Linear Motion Blurred Image", IPSJ SIG Technical Report, Vol. 2005, No. 38, pp. 47-52, 2005
Non-Patent Document No. 3: J. Bioucas-Dias, Bayesian wavelet-based image deconvolution: a gem algorithm exploiting a class of heavy-tailed priors", IEEE Trans. Image Proc., vol. 4, pp. 937-951, April 2006.
Non-Patent Document No. 4: Levin, "Blind Motion Deblurring Using Image Statistics", Advances in Neural Information Processing Systems (NIPS), December 2006
Non-Patent Document No. 5: Rob Fergus et al., "Removing camera shake from a single image", Barun Singh Aaron Hertzmann", SIGGRAPH 2006

SUMMARY OF INVENTION

Technical Problem

Since an optical camera shake correction has a limited correction range, the range of operation needs to be large in order to collect a sufficient amount of light in darker environments than conventional techniques. However, when it is large, there is a time delay due to the movement, and there is a physical limitation for increasing the size.

With the method of restoring an ideal image from a deteriorated image by signal processing, the restored image may have noise such as ringing. "Ringing" is noise with which a portion of an image where the brightness, or the like, is uniform (a flat portion) does not appear flat.

FIG. 1(a) is a plan view showing an image whose brightness changes stepwise (an ideal image near an edge), and FIG. 1(b) is a graph schematically showing the brightness distribution thereof. FIG. 2(a) is a plan view showing a deteriorated image (blurred image) obtained by taking a picture of the image of FIG. 1(a) with a camera, and FIG. 2(b) is a graph schematically showing the brightness distribution thereof. Assume that camera shake in the horizontal left/right direction has occurred during the camera picture-taking operation. In the deteriorated image of FIG. 2(a), sharpness of the edge is lost because of camera-shake blur (motion blur). FIG. 3(a) is a plan view showing an image obtained by restoring the deteriorated image of FIG. 2(a) by signal processing, and FIG. 3(b) is a graph schematically showing the brightness distribution of the restored image. The restored image of FIG. 3(a) includes a portion where the brightness varies periodically. Such brightness variations are the noise referred to as "ringing".

The method shown in Patent Document No. 1 uses data the blurred image, instead of using the result of restoration, around edges in order to reduce ringing which occurs around edges. In this method, the weight by which data of the blurred image is used is determined based on the edge strength in the screen. However, the edge strength cannot be determined unless the amount of camera shake is determined. The weight by which data of the blurred image is used cannot be determined unless the edge strength is determined. Thus, ringing cannot be removed.

The present invention has been made in order to solve the above problems, and has an object to provide an image-capturing device for performing an image process for reducing ringing in a flat portion of an image, taking into consideration the nature of human perception.

Solution to Problem

An image-capturing device of the present invention includes: an image-capturing element including a plurality of light-sensing cells arranged on an image-capturing surface;

an optical system for forming a first image which is in focus on the image-capturing surface in a first state and forming a second image which is out of focus on the image-capturing surface in a second state; and an image processing section for processing a signal obtained from the image-capturing element, wherein the image processing section generates a restored image obtained by reducing camera-shake blur from an image obtained by the image-capturing element in the second state.

In one preferred embodiment, the image-capturing device includes a memory for storing a point spread function which defines out-of-focus blur in the second state, wherein the image processing section reads out from the memory the point spread function which defines out-of-focus blur during an image-capturing operation and uses the point spread function for the generation of the restored image.

In one preferred embodiment, the optical system includes an image-forming lens, and an array of microlenses provided on the image-capturing element, and the microlenses are non-solid lenses whose focal distance varies.

In one preferred embodiment, the optical system includes a non-solid lens whose focal distance varies.

In one preferred embodiment, the image-capturing device further includes a display section, wherein an image obtained by the image-capturing element in the first state is displayed on the display section.

A program of the present invention is a program for controlling an operation an image-capturing device including: an image-capturing element including a plurality of light-sensing cells arranged on an image-capturing surface; an optical system for forming an image on the image-capturing surface; and an image processing section for processing a signal obtained from the image-capturing element, the program performing the steps of: forming a first image which is in focus on the image-capturing surface, by means of the optical system; forming a second image which is out of focus on the image-capturing surface, by means of the optical system; and generating a restored image obtained by reducing camera-shake blur from the image obtained by the image-capturing element in the second state, by means of the image processing section.

An image-capturing element of the present invention is an image-capturing element including: a plurality of light-sensing cells arranged on an image-capturing surface; and an array of microlenses provided on the image-capturing element, wherein the microlenses are non-solid lenses whose focal distance varies.

Advantageous Effects of Invention

According to this invention, it is possible to reduce ringing particularly in a flat portion of an image.

DESCRIPTION OF EMBODIMENTS

Figure 1:
FIG. 1 (*a*) is a plan view showing an image whose brightness changes stepwise (an ideal image near an edge), and (*b*) is a graph schematically showing the brightness distribution thereof.
Figure 1:
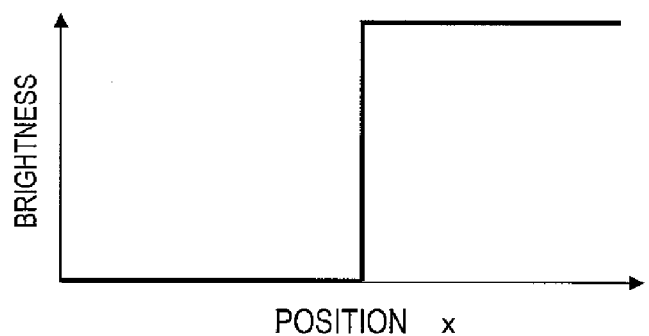
Figure 2:
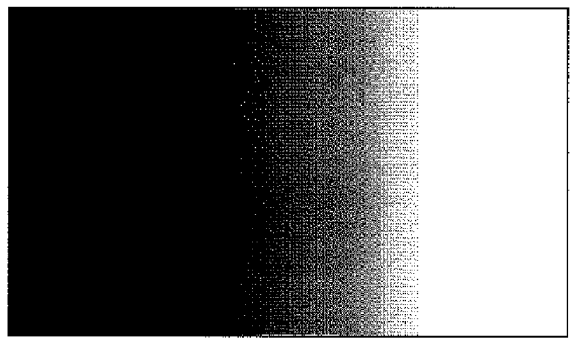
FIG. 2 (*a*) is a plan view showing a deteriorated image (blurred image) obtained by taking a picture of the image of FIG. 1(*a*) with a camera, and (*b*) is a graph schematically showing the brightness distribution thereof.
Figure 2:
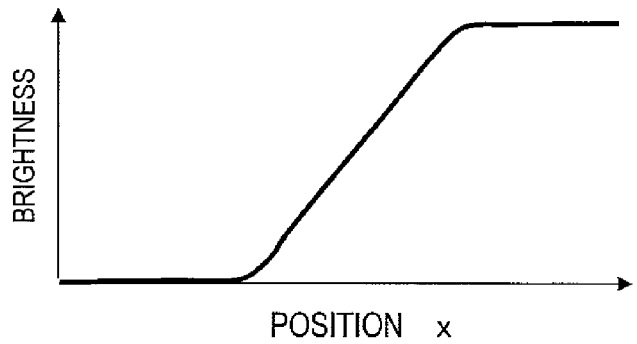
Figure 3:
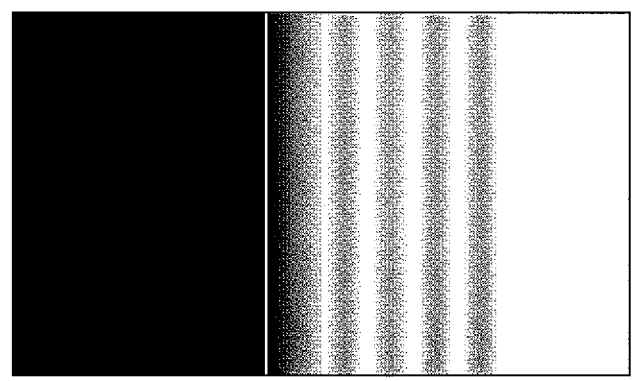
FIG. 3 (*a*) is a plan view showing an image obtained by restoring the deteriorated image of FIG. 2(*a*) by signal processing, and (*b*) is a graph schematically showing the brightness distribution of the restored image.
Figure 3:
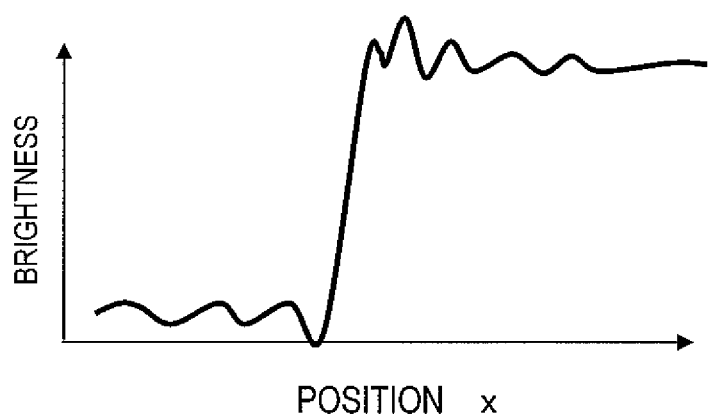

The basic principle of the present invention will be described before describing embodiments of the present invention.

In the present specification, the brightness distribution of an image formed on the image-capturing surface is expressed as i(x,y). Coordinates (x,y) are two-dimensional coordinates representing a position of a pixel (a light-sensing cell) on the image-capturing surface. Where an image is composed of M×N pixels arranged in a matrix pattern, for example, and where x and y are integers satisfying relationships $0 \le x \le M-1$ and $0 \le y \le N-1$, positions of individual pixels of the image can be identified by coordinates (x,y). It is herein assumed that the origin (0,0) of coordinates is at the upper left corner of the image, with the x axis extending in the vertical direction and the y axis in the horizontal direction. However, the particulars of the coordinates are not limited to those described above.

Expression 1 below holds where s(x,y) denotes the brightness distribution of a blurless image (an ideal image or an original image), and f(x,y) denotes the PSF, i.e., "point spread function", which defines the blur.

$$i(x,y) = s(x,y) * f(x,y) \qquad \text{[Expression 1]}$$

Here, the symbol "*" denotes convolution operation. Expression 1 can be generally expressed as shown in Expression 2 below.

$$s(x,y) * f(x,y) = \int_{-\infty}^{\infty} \int_{-\infty}^{\infty} s(j,k) f(x-j, y-k) dj dk \qquad \text{[Expresssion 2]}$$

Where an image is composed of M×N pixels, Expression 2 above can be expressed as shown in Expression 3 below.

$$s(x, y) * f(x, y) = \frac{1}{M \times N} \sum_{j=0}^{j=M-1} \sum_{k=0}^{k=N-1} s(j, k) f(x - j, y - k) \quad \text{[Expression 3]}$$

Where the function f(x,y), which is the point spread function PSF of the blur, is known, it is possible to restore a blurless image s(x,y) by performing a deconvolution operation on the image i(x,y) taken by the camera. Where f(x,y) is not known, it is necessary to obtain s(x,y) after estimating f(x,y) from the image.

Generally, a Fourier transform of a convolution between two functions can be expressed by the product between the Fourier transforms of the functions. Therefore, where Fourier transforms of i(x,y), s(x,y) and f(x,y) are denoted as I(u,v), S(u,v) and F(u,v), respectively, Expression 4 below is derived from Expression 1. Note that (u,v) are coordinates in the frequency domain, and correspond respectively to the spatial frequencies in the x direction and the y direction of the real image.

$$I(u,v) = S(u,v) \cdot F(u,v) \quad \text{[Expression 4]}$$

Herein, the symbol "·" denotes "product" between functions in the frequency domain. Expression 4 can be rearranged into Expression 5 below.

$$S(u, v) = \frac{I(u, v)}{F(u, v)} \quad \text{[Expression 5]}$$

Expression 5 shows that a function that is obtained by dividing the Fourier transform I(u,v) of the image i(x,y) taken by the camera by the Fourier transform F(u,v) of the point spread function PSF f(x,y) is equivalent to the Fourier transform S(u,v) of the ideal image s(x,y). That is, S(u,v) can be determined once I(u,v) and f(x,y) are obtained. Since I(u,v) is a Fourier transform of the image taken by the camera (a deteriorated image), it is possible to restore an image from a deteriorated image (to bring an image closer to the true image) by signal processing once f(x,y) representing the point spread function PSF of camera shake is obtained.

f(x,y) representing the point spread function PSF of camera shake depends on the locus of camera shake during picture-taking (exposure). In other words, the locus of camera shake is different for each camera picture-taking operation, and therefore f(x,y) is also different for each camera picture-taking operation. Although f(x,y) can be estimated from one or a plurality of images taken by the camera, it may be estimated by detecting, with a sensor, the movement of the camera (camera-shake locus) during picture-taking (exposure). However, f(x,y) is only obtained through estimation or measurement and contains some errors. Therefore, it is difficult to completely restore the ideal image s(x,y).

Non-Patent Document No. 2 discloses approximating the Fourier transform of the point spread function PSF of the locus of camera shake during short exposure time with a sinc function by assuming that the locus of camera shake is a "uniform linear motion". Where W denotes the width of camera shake and the direction of camera shake is the x-axis direction, F(u,v), which is the denominator of Expression 5, can be expressed as shown in Expression 6 below.

$$F(u, v) = \frac{\sin(W\pi u)}{W\pi u} \quad \text{[Expression 6]}$$

The right-hand side of Expression 6 is a sinc function, and the amplitude thereof becomes zero (0) periodically. The period is the inverse (1/W) of the width W of camera shake. If the direction of camera shake is at an angle of θ with respect to the x axis, F(u,v) is obtained by rotating the function of Expression 6 by the angle θ. Actual camera shake may leave a complicated locus, and the assumption of "uniform linear motion" may not hold true sufficiently.

The present inventors noticed that F(u,v), the denominator of Expression 5, periodically becoming zero in a low-frequency region is the primary cause of ringing in a flat portion of an image, arriving at the present invention. Herein, the "low-frequency region" is a region closer to the origin in the frequency domain, and is a region in which the spatial frequency of the brightness distribution is relatively low in the image. Such a low-frequency region corresponds to a flat portion (a portion with little brightness variation) of an image.

In the present invention, it is possible to reduce ringing in a flat portion (low-spatial frequency region) of an image when restoring an image deteriorated due to camera shake, or the like, by realizing an image-capturing operation such that F(u, v) does not become zero in the low-frequency region. Since ringing in a flat portion flat portion of an image is conspicuous to human eyes, the quality of an image is improved significantly by reducing ringing in a flat portion.

In a preferred embodiment of the present invention, out-of-focus blur is intentionally added to an image in the camera picture-taking operation. In the present specification, $f_1(x,y)$ denotes the point spread function PSF of camera-shake blur, and $f_2(x,y)$ denotes the point spread function PSF of out-of-focus blur. In this case, Expression 1, Expression 4 and Expression 5 can be rearranged respectively into Expression 7, Expression 8 and Expression 9 below.

$$i(x, y) = s(x, y) * (f_1(x, y) + f_2(x, y)) \quad \text{[Expression 7]}$$

$$I(u, v) = S(u, v) \cdot (F_1(u, v) + F_2(u, v)) \quad \text{[Expression 8]}$$

$$S(u, v) = \frac{I(u, v)}{F_1(u, v) + F_2(u, v)} \quad \text{[Expression 9]}$$

Herein, $F_1(u,v)$ and $F_2(u,v)$ are Fourier transforms of $f_1(x,y)$ and $f_2(x,y)$, respectively.

In a preferred embodiment of the present invention, the point spread function PSF of the out-of-focus blur intentionally added to the image, i.e., $f_2(x,y)$, is known. Generally, the point spread function PSF of out-of-focus blur can be expressed by a pillbox function or a Gaussian function. The Fourier transform of such a function does not become zero in the vicinity of zero frequency, i.e., in the low-frequency region, as long as the degree of defocus is appropriately adjusted.

In an embodiment of the present invention, the function $F_2(u,v)$ which does not become zero in the low-frequency region is added to $F_1(u,v)$ so that the denominator of Expression 9 does not become zero at least in the low-frequency region. As a result, ringing noise in a "flat portion" of an image is reduced, thereby realizing restoration of a high-quality image in which ringing is inconspicuous. The reason why ringing in a "flat portion" of an image can be reduced by introducing defocus will now be described.

Figure 4:
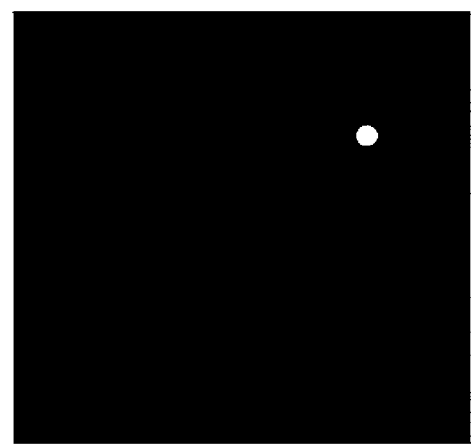
FIG. 4 (*a*) is a diagram schematically showing an image in which a particular pixel has a non-zero brightness with the other pixels having zero brightness (a point image), (*b*) is a diagram showing a point spread function PSF of out-of-focus blur, and (*c*) is a diagram showing an image obtained by convoluting the point spread function PSF of out-of-focus blur on the image of (*a*).
Figure 4:
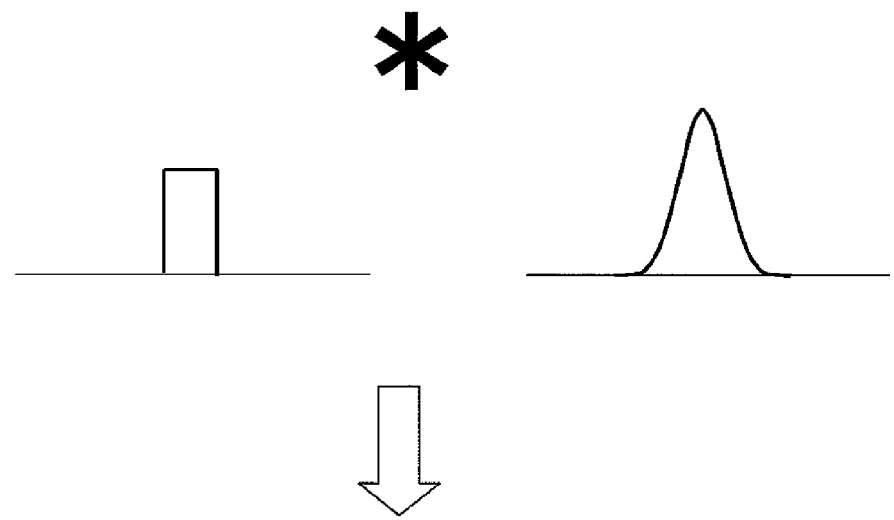
Figure 4:
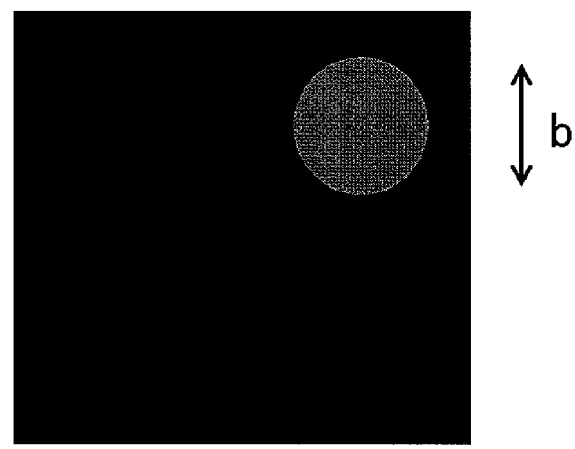

FIG. 4(*a*) is a diagram schematically showing an image in which a particular pixel has a non-zero brightness with the other pixels having zero brightness (a point image). FIG. 4(*b*) is a diagram showing a point spread function PSF of out-of-focus blur, wherein the left-side graph of FIG. 4(*b*) shows an example of a pillbox function, and the right-side graph shows an example of a Gaussian function. FIG. 4(*c*) is a diagram showing an image obtained by convoluting the point spread function PSF of out-of-focus blur on the image of FIG. 4(*a*). The image of FIG. 4(*c*) has out-of-focus blur. This blur, unlike camera-shake blur, has a brightness distribution that spreads symmetrically from the center. While the degree of blur is strictly defined by the point spread function PSF, it can be generally evaluated by the size (diameter or radius) of the spread of the point image.

Next, out-of-focus blur will be described in detail.

Figure 5:
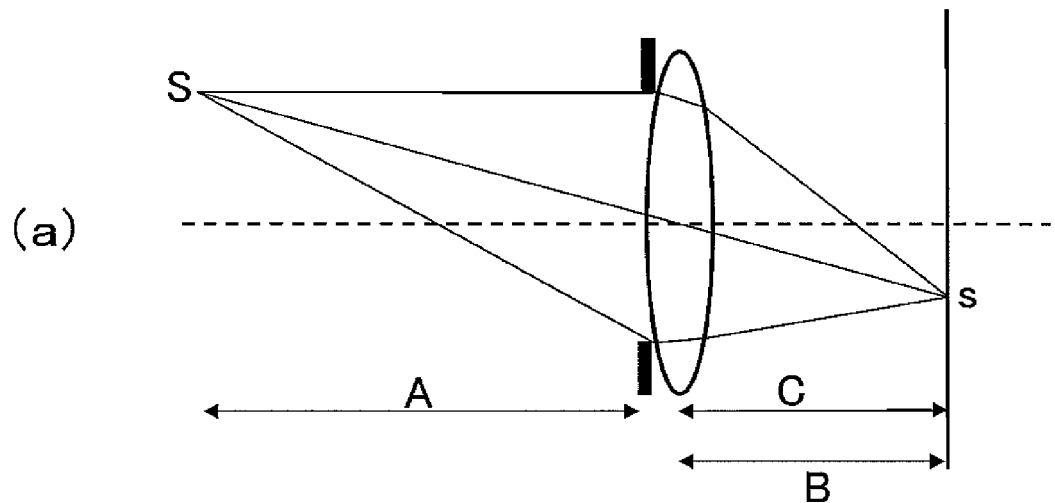
FIG. 5 (*a*) is a light beam diagram where an image-forming lens is in focus, and (*b*) is a light beam diagram where it is out of focus.
Figure 5:
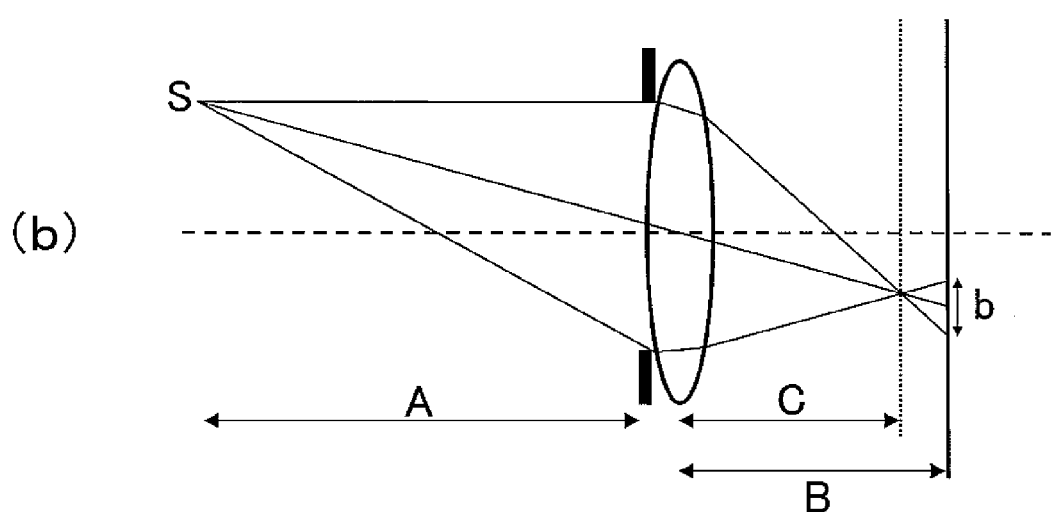

FIG. 5(*a*) is a light beam diagram where an image-forming lens is in focus, and FIG. 5(*b*) is a light beam diagram where it is out of focus. In the example of FIG. 5(*a*), a point S which is apart from the lens by a distance A forms an image of a point s on the image-capturing surface which is apart from the lens by a distance B.

In FIG. 5(*a*), the distance B coincides with the focal distance C of the lens. On the other hand, in FIG. 5(*b*), the distance B does not coincide with the focal distance C of the lens, and therefore the image on the image-capturing surface is blurred, with the spread of the brightness distribution having a diameter b.

The size (diameter b) of the spread of the blur can be approximately expressed as shown in Expression 10 below.

$$b \propto \gamma \left( \frac{1}{C} - \frac{1}{B} - \frac{1}{A} \right)$$ [Expression 10]

Herein, γ is the opening diameter of the lens.

As can be seen from Expression 10, the magnitude of b can vary depending on the distance A between the lens and the subject at the time of the image-capturing operation, the distance B between the lens and the image-capturing surface, the focal distance C, and the lens opening diameter γ.

The brightness distribution of the point image on the image-capturing surface can be approximately expressed by a pillbox function or a Gaussian function, for example, based on the point spread function PSF representing the out-of-focus blur.

In a case in which the point spread function PSF is approximated by a pillbox function, the PSF, i.e., $f_2(x,y)$, is expressed as shown in Expression 11 below.

$$f_2(x, y) = \frac{4}{\pi b^2} circ\left( \frac{\sqrt{(x^2 + y^2)}}{b} \right)$$ [Expression 11]

Herein, circ(X) is a circle function which takes a value of 1 when the absolute value of x is ½ or less, and a value of 0 otherwise. On the other hand, in a case in which the point spread function PSF of the out-of-focus blur is approximated by a Gaussian function, $f_2(x,y)$ is expressed as shown in Expression 12 below.

$$f_2(x, y) = \frac{1}{2\pi\sigma^2} \exp\left( -\frac{(x^2 + y^2)}{2\sigma^2} \right)$$ [Expression 12]

σ is the standard deviation of the Gaussian distribution, and can be assumed to be a value that is about the same as the spread of the blur of the point image (radius b/2), for example. Thus, the PSF of the out-of-focus blur, i.e., $f_2(x,y)$, can be obtained by measurement from the image on the image-capturing surface shown in FIG. 5(*b*). The smaller the aberration of the image-forming lens, the better the point spread function PSF can be approximated by a pillbox function.

In an embodiment of the present invention, the focal distance of the lens is variable as will be described below. As a result, with one image-capturing device, the point spread function PSF representing out-of-focus blur, i.e., $f_2(x,y)$, can be adjusted. When taking a picture with an image-capturing device, $f_2(x,y)$ defining the out-of-focus blur at this point is "known" in a preferred embodiment of the present invention.

A Fourier transform of a pillbox function is a $0^{th}$-order first kind Bessel function $J_0$, and a Fourier transform of a Gaussian function is a Gaussian function. Such a function $F_2(u,v)$ takes a maximum value at (u,v)=(0,0) in either case, and has relatively large values in the low-frequency region. A Bessel function becomes zero at a particular frequency, whereas a Gaussian function does not become zero. Therefore, in the low-frequency region, $F_1(u,v)$ and $F_2(u,v)$ do not become zero at the same frequency, and $F_1(u,v)+F_2(u,v)$ has a non-zero value.

As is clear from the above description, it is possible with the present invention to ensure that the denominator of Expression 9 does not become zero at least in the low-frequency region. As a result, ringing noise in a "flat portion" of an image is reduced, thereby realizing restoration of a high-quality image in which ringing is inconspicuous.

A first embodiment of an image-capturing device of the present invention will now be described.

Figure 6:
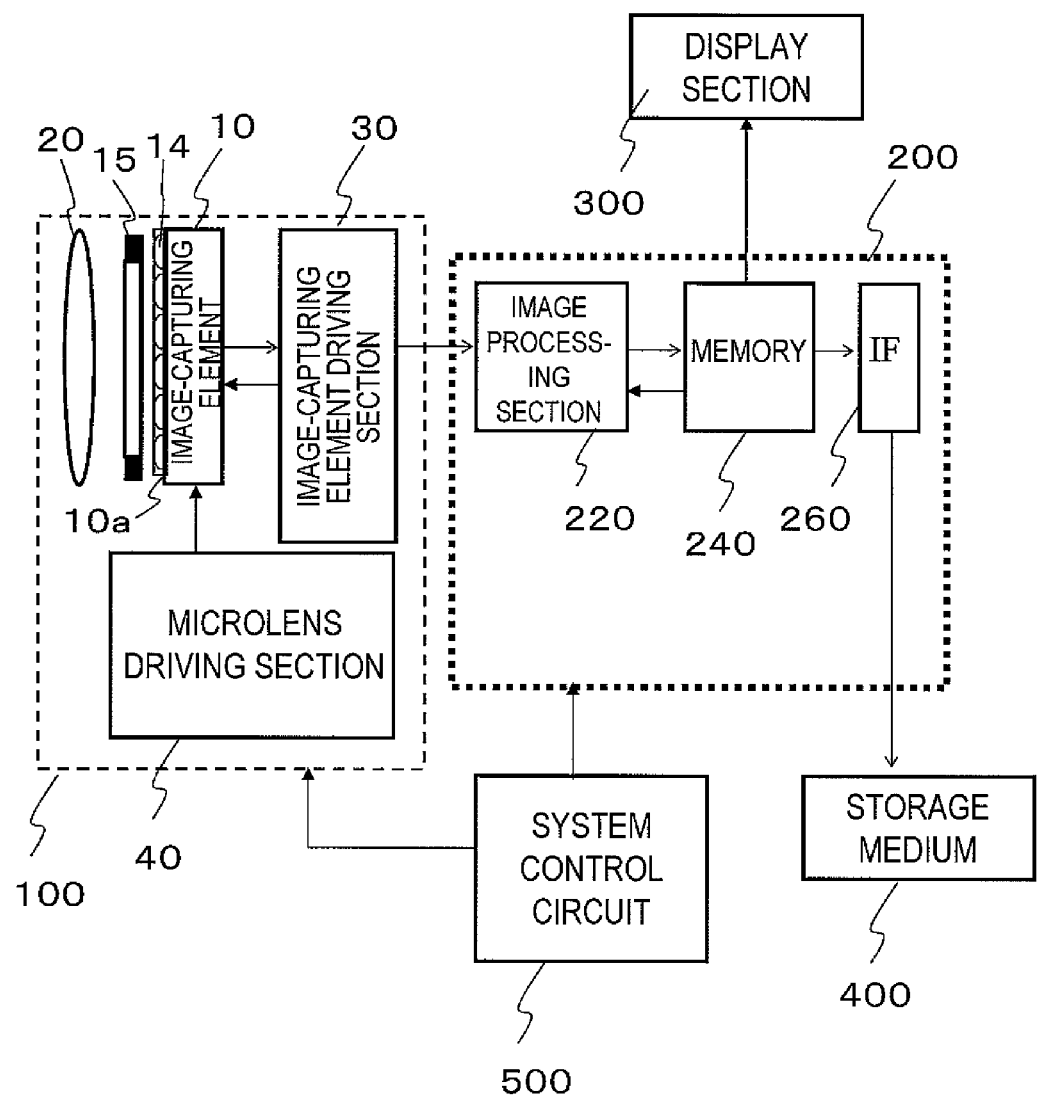
FIG. 6 A block diagram showing a general configuration of an image-capturing device of the present embodiment.

FIG. 6 is a block diagram showing a general configuration of an image-capturing device of the present embodiment.

The image-capturing device of the present embodiment is a digital electronic camera, but the present invention is not limited thereto. As illustrated in FIG. 6, the image-capturing device of the present embodiment includes an image-capturing section 100, a signal processing section 200 for performing various signal processes, a captured image display section 300 for displaying an image obtained by an image-capturing operation, a recording section 400 for recording data of an image, and a system control section 500 for controlling various sections. A primary difference between the image-capturing device of the present embodiment and known image-capturing devices is the configuration of the image-capturing section 100 and the operation of the signal processing section 200. Therefore, in the following description, the image-capturing section 100 and the signal processing section 200 will be primarily described in detail.

The image-capturing section 100 of the present embodiment includes an image-capturing element (image sensor) 10 having a plurality of light-sensing cells (photodiodes) arranged on an image-capturing surface 10*a*, a shutter 15 having an aperture function, and a picture-taking lens 20 for forming an image on the image-capturing surface 10*a* of the image-capturing element 10. A typical example of the image-capturing element 10 is a CCD or CMOS sensor. An array of microlenses 14 is provided at a position facing the image-capturing surface 10*a* of the image-capturing element 10. The picture-taking lens 20 has a known configuration, and may in practice be a lens unit including a plurality of lenses. The shutter 15 and the picture-taking lens 20 are driven by a mechanism (not shown) for operations necessary for optical zooming, auto exposure (AE) and auto focus (AF).

Moreover, the image-capturing section 100 includes an image-capturing element driving section 30 for driving the image-capturing element 10, and a microlens driving section 40. The image-capturing element driving section 30 may be formed by a semiconductor integrated circuit such as a CCD driver, for example. The image-capturing element driving section 30 drives the image-capturing element 10 to thereby read out an analog signal (photoelectrically converted signal) from the image-capturing element 10, and converts it to a digital signal. The microlens driving section 40 drives a microlens 14a so as to adjust the focus blur of an image formed on the image-capturing surface 10a.

The signal processing section 200 of the present embodiment includes an image processing section (image processor) 220, a memory 240, and an interface (IF) section 260. The signal processing section 200 is connected to a display section 300 such as a liquid crystal display panel, and a storage medium 400 such as a memory card.

The image processing section 220 performs the restoration process of a deteriorated image of the present invention, in addition to performing various signal processes such as tone correction, resolution change and data compression. The image processing section 220 is preferably implemented by a combination of hardware such as a known digital signal processor (DSP), and software for performing image processes. The memory 240 is formed by a DRAM, or the like. The memory 240 stores image data obtained from the image-capturing section 100, and also temporarily stores image data which has undergone various image processes by the image processing section 220 and compressed image data. The image data is stored in the storage medium 400 via the interface section 260 after it is converted to an analog signal and displayed on the display section 300 or as it is as a digital signal. The image data may be transmitted to another device (not shown) via a communication device (not shown) through a wireless or wired connection.

The components are controlled by the system control section 500 including a central processing unit (CPU) (not shown) and a flash memory. While the image-capturing device of the present embodiment may include known components such as an optical finder, a power source (battery) and a flashlight, the description thereof is omitted because it is not particularly necessary for understanding the present invention.

Next, the configuration of the image-capturing section 100 will be described in greater detail with reference to FIGS. 7 to 9.

Figure 7:
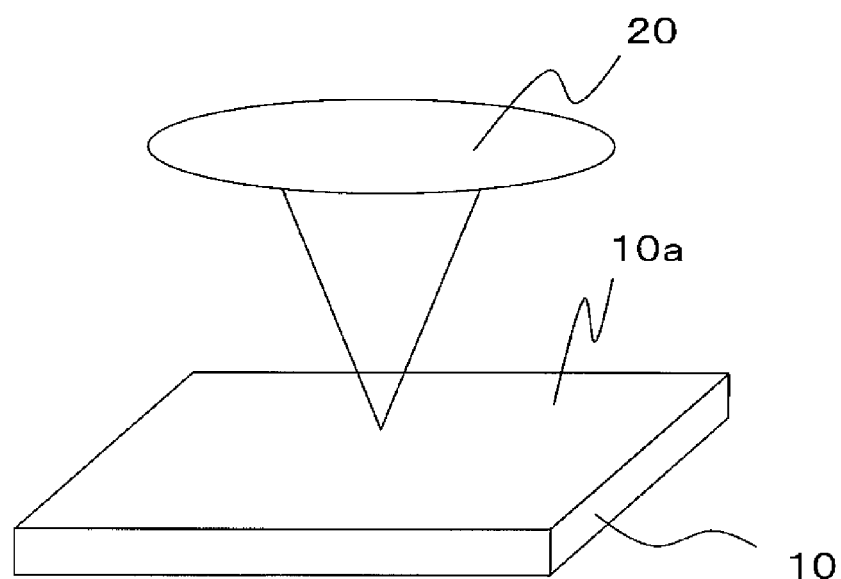
FIG. 7 A diagram schematically showing a general configuration of an image-capturing element 10 and a picture-taking lens 20 of an image-capturing section 100.
Figure 8:
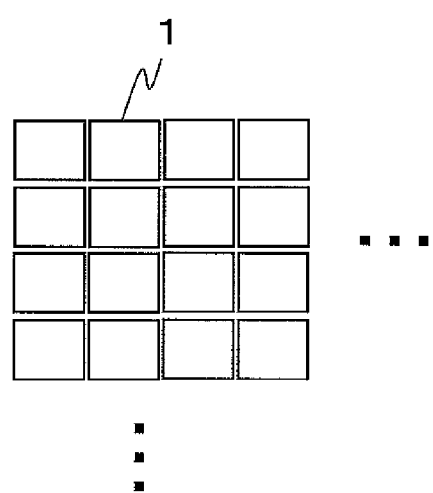
FIG. 8 A schematic top view of an image-capturing surface 10*a* of the image-capturing element 10.

FIG. 7 schematically shows a general configuration of the image-capturing element 10 and the picture-taking lens 20 in the image-capturing section 100. The image-capturing element 10 of FIG. 7 includes the image-capturing surface 10a, and a plurality of light-sensing cells are arranged on the image-capturing surface 10a. FIG. 8 is a schematic top view of the image-capturing surface 10a. In this example, a plurality of light-sensing cells 1 are arranged in a matrix pattern. The form of arrangement of the light-sensing cells 1 is not limited to that shown in the figure, and the planar shape of each light-sensing cell is not limited to square. In order to generate color image signals, primary color filters or complementary color filters are typically arranged on the individual light-sensing cells 1. Another configuration may be employed, which includes three image-capturing elements wherein light is split into three colors of R, G and B, for example, so that the light beams of different colors enter different image-capturing elements.

Figure 9:
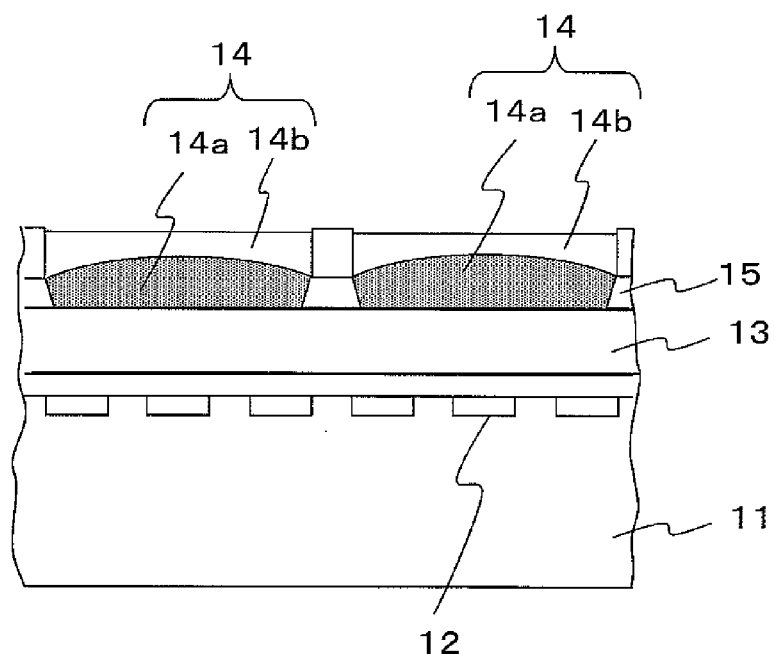
FIGS. 9 (*a*) and (*b*) are diagrams each schematically showing a cross-sectional structure of a part of an image-capturing element 100.
Figure 9:
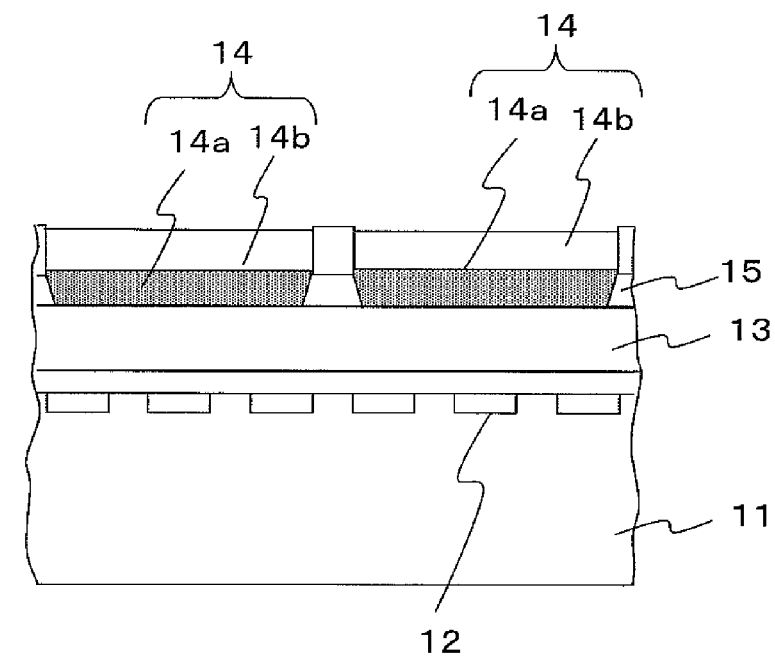

FIG. 9 schematically shows a cross-sectional configuration of a part of the image-capturing element 100. FIG. 9 shows the cross section of six light-sensing cells. As can be seen from FIG. 9, the image-capturing element 100 includes an array of photoelectric conversion regions 12 formed on the surface of a semiconductor chip 11, an insulating layer 13 covering the surface of the semiconductor chip, an array of microlenses 14 opposing the individual photoelectric conversion regions 12, and an electrode 15 for driving the microlens 14. In the example of the present embodiment, one microlens 14 is assigned for nine (3 rows by 3 columns) light-sensing cells. The number of light-sensing cells covered by the individual microlenses 14 is not limited to the example above.

The microlens 14 is a "liquid lens" including an oil portion 14a and an aqueous solution portion 14b which are provided in a cell and have an equal specific gravity. The microlens 14 has a configuration such that the curvature of the interface (liquid-liquid interface) between the oil portion 14a and the aqueous solution portion 14b changes based on the potential of the electrode 15. Specifically, the aqueous solution portion 14b is drawn toward the electrode 15 by the electrostatic force which is generated based on the voltage of the electrode 15, thereby bending the oil portion 14a. FIG. 9(a) shows a state where the curvature of the interface has been decreased by voltage application so that it has a finite focal distance. On the other hand, FIG. 9(b) shows a state where the curvature of the interface is very large (substantially infinite) so that the lens effect is not exerted. The potential of the electrode 15 is controlled by the microlens driving section 40 shown in FIG. 6.

Such a microlens 14 is not limited to the liquid lens described above as long as the focal distance can be varied. For example, it may be a "liquid crystal lens". Since liquid crystal is a liquid having birefringence and dielectric anisotropy, the refractive index of a predetermined direction can be adjusted based on the applied voltage. The liquid crystal lens is a lens whose refractive index is varied based on the applied voltage, thereby varying the focal distance. Also with such a liquid crystal lens, it is possible to realize the microlens 14 whose focal distance is variable.

With the image-capturing element 100 of the present embodiment, it is possible to for example form an image that is in focus in the state shown in FIG. 9(b) on an image-capturing surface, and then turn it into an image that is intentionally defocused by actuating the microlenses 14. The in-focus image is easily formed by ordinary auto focus techniques.

Assume that motion blur has occurred in the image due to camera shake during exposure when capturing an image in a state where it is intentionally defocused. The point spread function PSF of the blur of the image obtained as described above is the sum of $f_1(x,y)$ and $f_2(x,y)$ as described above.

Since the shape of the microlens 14 depends on the voltage applied to the microlens 14, the PSF of out-of-focus blur, i.e., $f_2(x,y)$, is a function of the voltage applied to the microlens 14.

How to calculate $f_2(x,y)$ will now be described.

Figure 10:
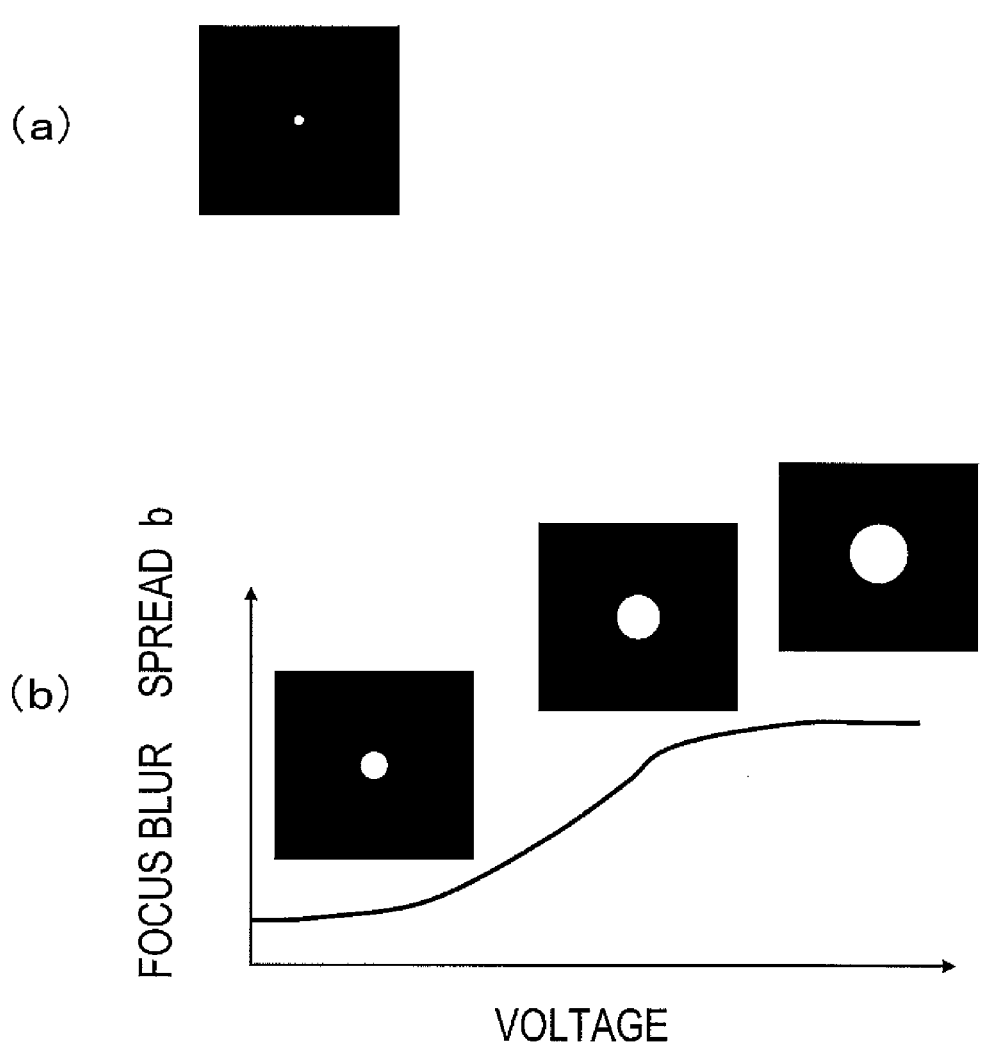
FIG. 10 (*a*) is a diagram showing a pattern having a small bright spot at the center with a black background, and (*b*) is a graph showing the relationship between focus blur (diameter b) and the voltage applied to a microlens.

First, an image of a pattern having a small bright spot at the center with a black background as shown in FIG. 10(a) is taken. At this point, focus is achieved with the normal picture-taking lens 20 shown in FIG. 6 without applying a voltage to the microlens 14.

Then, only the voltage given to the microlens 14 is varied while the picture-taking parameters (the lens opening, the exposure time, the focus, etc.) of the image-capturing device are fixed. Thus, since blur occurs in the image, the point whose image is formed on the image-capturing surface spreads in a circular pattern. Thus, it is possible to obtain the relationship between the voltage applied to the microlens 14 and the spread of the point image (diameter b: focus blur). FIG. 10(b) is a graph showing voltage dependency of focus blur (diameter b). As shown in FIG. 10(b), the degree of focus blur increases as the voltage increases. This is because the degree of defocus of the microlens 14 increases as the voltage increases.

Where the PSF of out-of-focus blur is approximated by a pillbox function by which a point spreads in a round columnar shape, the spread (diameter b) of the point image on the image-capturing surface 10a corresponds to the diameter of the round column. Therefore, it is possible to determine the PSF (pillbox function) representing the out-of-focus blur by measuring the spread of the point image. The spread of the point image can be expressed by the number of pixels on the image-capturing surface 10a, and can easily be detected by the image-capturing element 100.

Depending on the shape of the lens, the in-plane brightness of the point image may exhibit a Gaussian distribution due to aberration, or the like. In such a case, it is preferred that the PSF of out-of-focus blur is approximated by a Gaussian function. Since the brightness distribution of the point image which has spread on the image-capturing surface is measured by the image-capturing element 100, it is possible to determine c of the corresponding Gaussian function based on the brightness distribution.

Thus, the relationship between the PSF ($f_2(x,y)$) defining out-of-focus blur and the voltage applied to the microlens 14 is determined by measurement in advance and is stored in a table of a memory of the image-capturing device, for example. The PSF ($f_2(x,y)$) is also dependent on picture-taking parameters such as the focal distance and the aperture opening diameter of the picture-taking lens 20. That is, the focal distance of the picture-taking lens 20 changes as the distance to subject changes, and the depth of field changes as the opening diameter changes. Therefore, it is preferred that many PSFs ($f_2(x,y)$) are measured, associated with possible combinations of picture-taking parameter values, and stored in the memory. Then, during the actual picture-taking operation, it is possible to obtain the PSF ($f_2(x,y)$) of defocus based on the picture-taking parameters.

Next, the operation when the user captures an image using an image-capturing device of the present embodiment will be described.

First, the user directs the image-capturing device toward the subject and half-presses the shutter button, as if to perform an image-capturing operation with a normal digital camera, and the subject is thereby brought into focus by the auto focus action. At this point, the microlenses 14 have no voltage applied thereto, and are in a state shown in FIG. 9(b).

When the user deeply presses down the shutter button, a voltage is applied to all the microlenses 14 of the image-capturing element 10, and "exposure" is started. At this point, an image with out-of-focus blur is formed on the image-capturing surface of the image-capturing element 10. If the image-capturing device is moved unstably by the user during the exposure, the image moves around on the image-capturing surface of the image-capturing element 10, thereby adding camera-shake blur.

The signal processing section 200 receives the signal obtained by the image-capturing section 100. An image obtained as described above is a deteriorated image represented by i(x,y) which is the left-hand side Expression 7. The image processing section 220 in the signal processing section 200 performs a process for restoring s(x,y) from i(x,y). The algorithm for the restoration process is not limited to any particular algorithm, and may be any of known image restoration processes.

Figure 11:
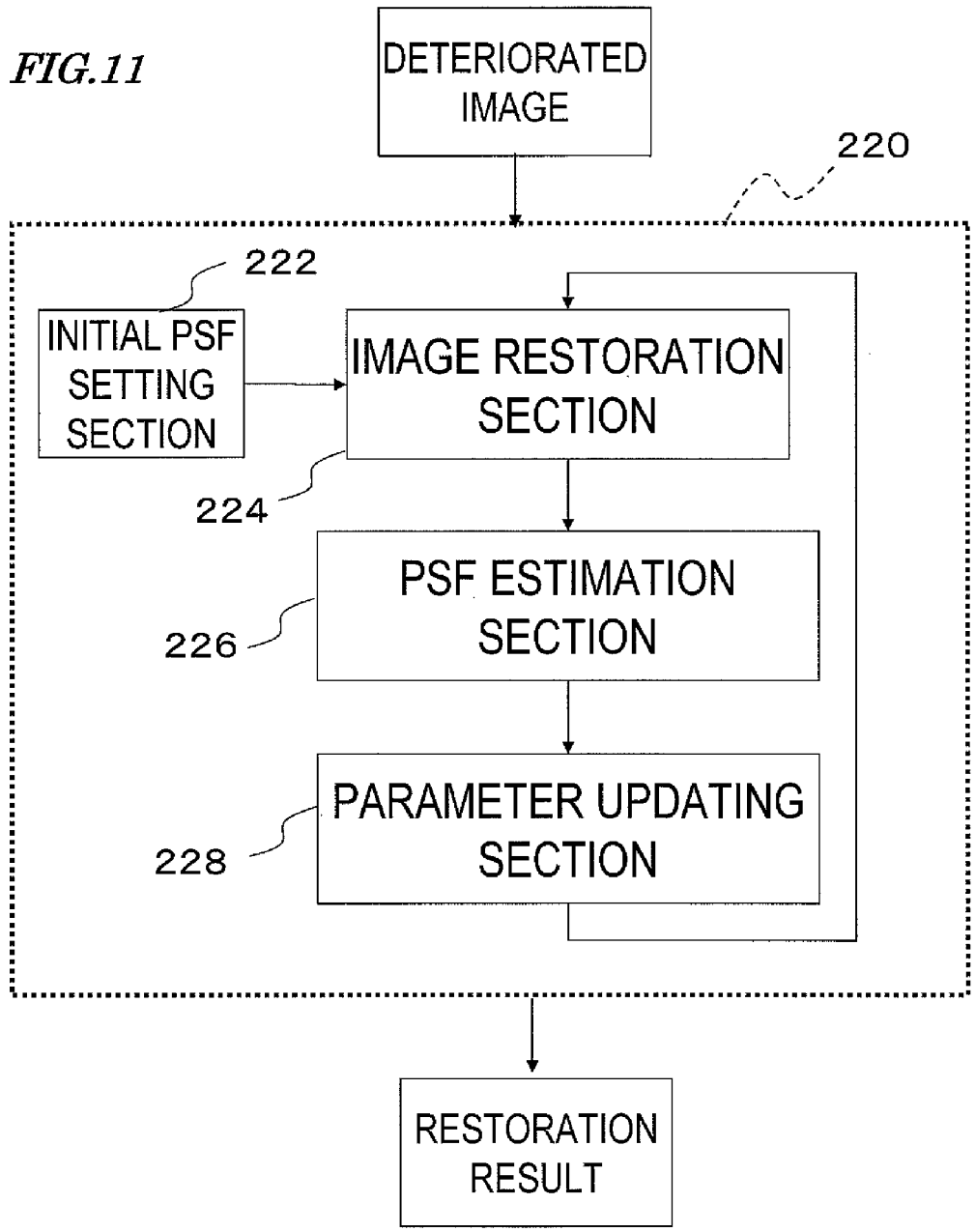
FIG. 11 A block showing a configuration example of an image processing section 220 shown in FIG. 6.
Figure 12:
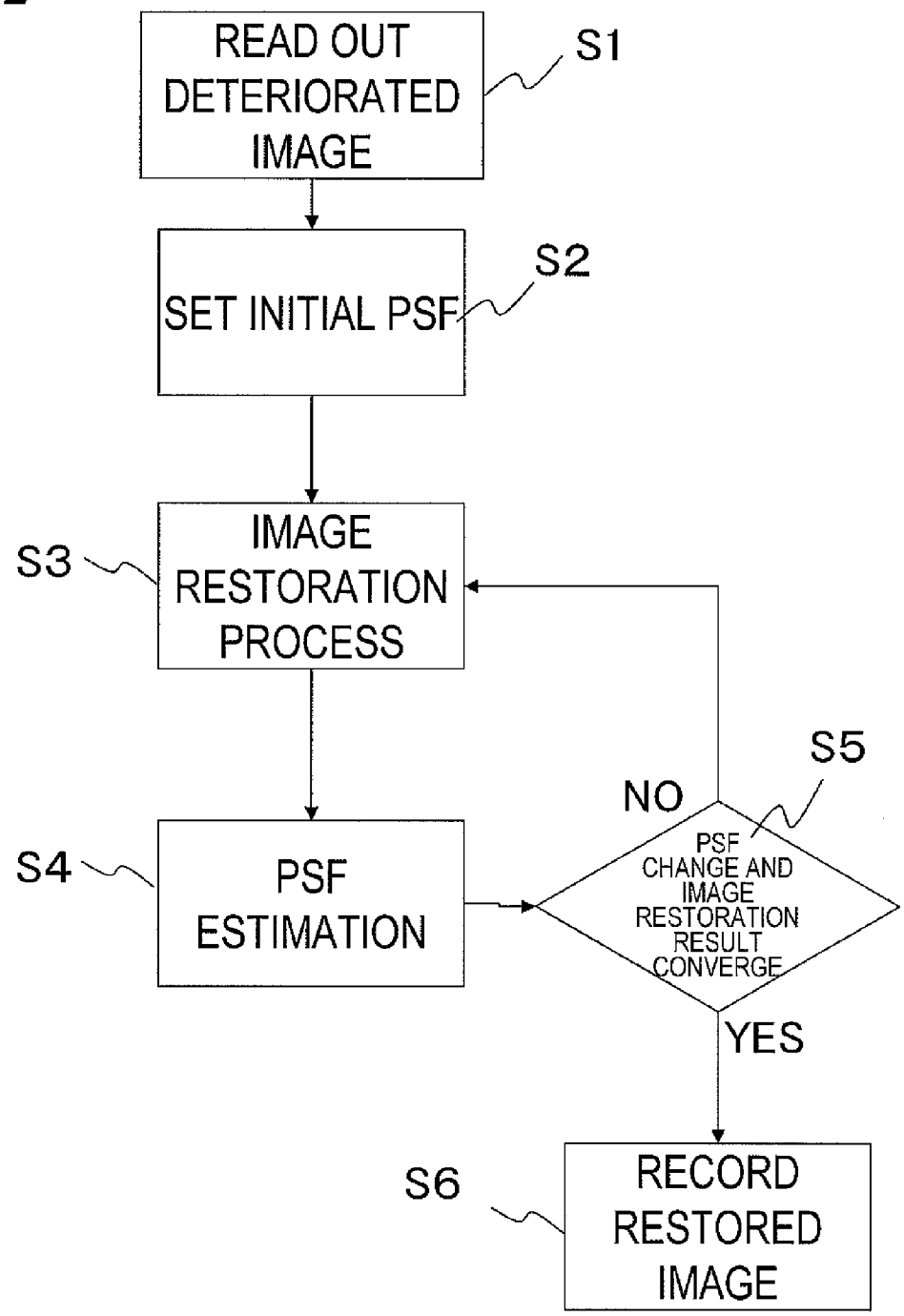
FIG. 12 A flow chart showing an example of a restoration process performed in an embodiment of the present invention.

An example of a restoration process that can be performed in the present embodiment will now be described with reference to FIGS. 11 and 12. FIG. 11 is a block showing a configuration example of the image processing section 220 shown in FIG. 6, and FIG. 12 is a flow chart showing an example of the restoration process.

First, refer to FIG. 11. The image processing section 220 shown in FIG. 11 includes an initial PSF setting section 222, an image restoration section 224, a PSF setting section 226, and a parameter updating section 228, and receives an input of a deteriorated image to output a restoration result. The initial PSF estimation section 222 sets an initial PSF necessary for the process performed by the image restoration section 224. The initial PSF may be obtained by detecting the motion (locus) of the camera by a sensor such as a gyrosensor and determined based on the locus, or it may be manually input by the user. In view of the objective of shortening the amount of time required for the image process, the initial PSF is preferably close to the true PSF. Therefore, it is preferred that the initial PSF is set to be a PSF obtained by adding the out-of-focus PSF to the PSF determined based on the locus of the camera detected by the sensor.

The image restoration section 224 obtains a restored image from a deteriorated image based on the initial PSF. The PSF estimation section 226 estimates the PSF based on the deteriorated image and the restored image obtained by the image restoration section 224. The parameter updating section 228 updates the initial PSF (the PSF used in the previous image restoration) with the PSF obtained by the PSF estimation section 226 (the estimated PSF). The updated PSF is given to the image restoration section 224, and the process described above is repeated.

The configuration shown in FIG. 11 is an example of functional blocks of the image processing section 220, and the image processing section 220 can be divided into other functional blocks. The image processing section may suitably be implemented by incorporating image process software in known hardware, for example.

Next, the schematic procedure of the restoration process will be described with reference to FIG. 12.

First, in step S1, a deteriorated image is read out. Specifically, the image processing section 220 obtains a deteriorated image to be the base of the restoration process from the memory 240 of FIG. 6. The deteriorated image is an image obtained by the image-capturing section 100 of FIG. 6, and is provided with intentional out-of-focus blur added thereto in the present embodiment. Typically, camera-shake blur (motion blur) is also added to the deteriorated image due to a shake (motion) of the image-capturing section 100 by the user.

In step S2, the initial PSF setting section 222 sets the initial PSF. In step S3, the image restoration section 224 performs the image restoration process using the deteriorated image obtained in step S1 and the initial PSF set in step S2. This image restoration process can be performed by a known restoration algorithm in the image restoration section 224 of FIG. 11. The image restoration section 224 once stores the obtained restored image in the memory 240. In step S4, the PSF estimation section 226 estimates the PSF from the restored image, and the parameter updating section 228 updates the previous PSF with the estimated PSF.

In step S5, it is determined whether the change between PSFs before and after the update and the change between restored images before and after the update are smaller than predetermined threshold values, and if so, it is determined that the process has converged. In step S6, the restoration result is stored in the memory 240.

The details of the PSF estimation and the image restoration performed in steps S2 to S3 will now be described.

Here, a case of a signal processing method disclosed in Non-Patent Document No. 1 will be described. In a case of the signal processing method of Non-Patent Document No. 1, it is necessary to first give an initial PSF. This initial PSF is given manually or by a camera shake detector (an external device such as a gyrosensor). The first image restoration is performed based on this initial PSF. Although the PSF at this stage is not always equal to the true PSF (the correct solution), the restored result is closer to the original image than the deteriorated image is.

Then, the PSF is estimated from the first restored image which is the result of the first image restoration. Since the first restored image is closer to the original image than the deteriorated image is, the estimated PSF is closer to the correct solution. Then, the second image restoration is performed by using the estimated PSF, i.e., by updating the initial PSF with the next PSF. By repeating this process until there is no change in the PSF and no change in the image restoration result, the PSF estimation and the image restoration are performed simultaneously.

A more specific method of the image restoration process will now be described.

First, prior to the image restoration, the initial PSF is given by the initial PSF setting section 222. While the initial PSF is given manually in the method disclosed in Non-Patent Document No. 1, the initial value of the PSF is set based on motion information obtained by a gyrosensor in the present embodiment.

The image restoration section 224 restores an image using a given PSF (which is an initial value at first, and an updated value thereafter) and a deteriorated image. The evaluation expression $E_L$ used in this process is shown in Expression 13.

$$E_L = \left( \sum_{\partial^* \in \Theta} w_{\kappa(\partial^*)} \|\partial^* L \otimes f - \partial^* I\|_2^2 \right) + \quad \text{[Expression 13]}$$
$$\lambda_1 \|\Phi(\partial_x L) + \Phi(\partial_y L)\|_1 +$$
$$\lambda_2 (\|\partial_x L - \partial_x I\|_2^2 \cdot M + \|\partial_y L - \partial_y I\|_2^2 \cdot M).$$

Here, I is the deteriorated image, L is an image with no motion blur and no blur, and f is the point spread function PSF. The variables wk, $\lambda 1$ and $\lambda 2$ are "weights" which are manually set. $\Theta$ is a set of operators which define the kind of differentiation to be performed on the image. Specifically, there are a total of six differential parameters for the $0^{th}$-order differentiation, the $1^{st}$-order differentiation (once for each of the x and y directions), and the $2^{nd}$-order differentiation (twice for the x direction, twice for the y direction, once for each of the x and y directions). d* is a differential operator. $\Theta$ can be expressed using d* as follows: $\Theta = \{d^0, d_x, d_y, d_{xx}, d_{xy}, d_{yy}\}$. With d*, it is possible to perform an operation using both the brightness information and the edge information, and it is possible to obtain information which cannot be obtained only with the brightness. M is a two-dimensional mask which includes elements of "1" for pixels included in a flat region, i.e., a locally smooth region ($\Omega$), in the image, and includes elements of "0" for other pixels. $\|\cdot\|_p$ is a p-norm operator. $\Phi(x)$ is a function that approximately represents the relationship between the brightness gradient x and the distribution density (logarithmic expression) in a naturally-observed image.

The first term in the right-hand side of Expression 13 is a term that represents the difference (distance) between an image obtained by convolution between the restored image L and the point spread function f and the deteriorated image I. By performing an operation using six differential parameters on the image, it is possible to evaluate the similarity between images based on information other than brightness.

The second term in the right-hand side of Expression 13 is a term that represents a nature of the brightness gradient property across the image (referred to as the "heavy tail"). $\Phi(d_x L)$ and $\Phi(d_y L)$ have such a statistical nature that when the brightness gradient of the restored image is represented by a histogram, the occurrence probability has a sharp peak around zero gradient and the occurrence probability decreases as the gradient increases. In the second term, the distance from the distribution representing the above statistical nature is calculated for each of the gradient in the x direction and the gradient in the y direction. This statistical nature is utilized also in the methods disclosed in Non-Patent Documents Nos. 3-5.

The third term in the right-hand side of Expression 13 is a term that evaluates the flatness using the mask M, the differentiated deteriorated image, and the differentiated restored image. In a flat region, the deteriorated image and the restored image have close brightness gradient values. Therefore, errors between gradient values in the x and y directions are used as evaluation values.

By obtaining L that minimizes the right-hand side of Expression 13, it is possible to obtain the restored image L (the optimization of L). A specific calculation method for the optimization of L is disclosed in Non-Patent Document No. 1.

Next, the process by the PSF estimation section 226 performed after the restored image L is obtained will be described in detail.

The PSF estimation is a problem of estimating the point spread function f using the restored image L obtained by the image restoration section 224 and the deteriorated image I. It is possible to obtain the point spread function f (the optimization of f) by determining f so as to minimize the right-hand side of Expression 14 below.

$$E(f) = \left( \sum_{\partial^* \in \Theta} w_{\kappa(\partial^*)} \|\partial^* L \otimes f - \partial^* I\|_2^2 \right) + \|f\|_1. \quad \text{[Expression 14]}$$

The first term in the right-hand side of Expression 14 corresponds to the first term in the right-hand side of Expression 13, and gives an evaluation criterion that indicates whether the convolution between the restored image L and the point spread function f is close to the deteriorated image I. The second term in the right-hand side of Expression 14 is a 1-norm of the point spread function f. The second term is a term based on the concept called "sparse coding". Since most elements in the matrix of the point spread function f are 0 (no motion), this optimization term is used. In the present embodiment, an optimization is performed by the "interior point method" as in Non-Patent Document No. 1, and it is therefore possible to realize the total optimization.

The procedure of image restoration is not limited to the example above. For example, the Richardson-Lucy (LR) method or the Wiener filter method may be used.

An important point in the image restoration of the present embodiment is that the point spread function PSF of the intentional out-of-focus blur is known. Since information of motion can be obtained by a gyrosensor, if the point spread function PSF thereof is known, image restoration can be done by using convenient methods known in the art such as the LR method, even if defocus occurs. Therefore, it is possible to reduce the load on signal processing.

Although an image is restored by blind deconvolution in which even the PSF which defines the camera-shake blur is an object of estimation in the present embodiment, the present invention is not limited to this. If the "camera-shake locus" can be detected with a high precision by means of a gyrosensor attached to the image-capturing device, the PSF obtained based on the detected camera-shake locus may be used not only simply as an initial value for the image restoration process but also as the final PSF which defines the camera-shake blur. In this case, the PSF which defines the out-of-focus blur is also known, and therefore the blur point spread functions are all known, what is left to be estimated is only the restored image.

According to the present embodiment, since intentional out-of-focus blur is added to the deteriorated image, irrespective of the method of restoration, there is an advantage that ringing is inconspicuous in a flat portion of an image even when restoring an image deteriorated due to camera-shake blur (motion blur).

The configuration in which the focal distance is variable is not limited to the configuration of the present embodiment. An intentional offset may be given to the auto focus control loop during exposure so as to shift the focal position of the picture-taking lens after an in-focus image is formed by the picture-taking lens. A liquid crystal cell having a uniform liquid crystal layer sealed between a pair of substrates may be inserted in the optical path, and a switching operation may be performed between a state where a voltage is applied to the liquid crystal layer and another state where no voltage is applied. Also with such a configuration, it is possible to shift the focal position of the picture-taking lens during exposure so as to give out-of-focus blur.

INDUSTRIAL APPLICABILITY

The image-capturing device of the present invention is capable of restoring an image with reduced ringing in a flat portion, and is therefore applicable to electronic still cameras, and the like.

REFERENCE SIGNS LIST

| | |
|---|---|
| 10 | Image-capturing element |
| 20 | Picture-taking lens |
| 15 | shutter having aperture function |
| 30 | Image-capturing element driving section |
| 40 | Microlens driving section |
| 100 | Image-capturing section |
| 200 | Signal processing section |
| 220 | Image processing section |
| 240 | Memory |
| 260 | Interface (IF) |
| 300 | Display section |
| 400 | Storage medium |
| 500 | System control section |

The invention claimed is:

1. An image-capturing device comprising:
an image-capturing element including a plurality of light-sensing cells arranged on an image-capturing surface;
an optical system for forming a first image which is in focus on the image-capturing surface in a first state and forming a second image which is out of focus on the image-capturing surface in a second state;
a memory for storing a point spread function which defines out-of-focus blur in the second state, and
an image processing section for processing a signal obtained from the image-capturing element,
wherein the image-capturing element is configured to capture an image including the out-of-focus blur in the second state, the out-of-focus blur being defined by the point spread function stored in the memory,
wherein the image processing section is configured to read out from the memory the point spread function which defines the out-of-focus blur and generate a restored image obtained by reducing camera-shake blur from an image obtained by the image-capturing element in the second state, the image processing section using the point spread function which defines the out-of-focus blur to reduce the camera-shake blur from the image.

2. The image-capturing device according to claim 1, wherein the optical system includes an image-forming lens, and an array of microlenses provided on the image-capturing element, and the microlenses are non-solid lenses whose focal distance varies.

3. The image-capturing device according to claim 1, wherein the optical system includes a non-solid lens whose focal distance varies.

4. The image-capturing device according to claim 1, further comprising a display section,
wherein an image obtained by the image-capturing element in the first state is displayed on the display section.

5. A non-transitory computer-readable medium storing a program for controlling an operation of an image-capturing device including: an image-capturing element including a plurality of light-sensing cells arranged on an image-capturing surface; an optical system for forming an image on the image-capturing surface; a memory, and an image processing section for processing a signal obtained from the image-capturing element, the program performing the steps of:
forming a first image which is in focus on the image-capturing surface, by means of the optical system;
forming a second image which is out of focus on the image-capturing surface, by means of the optical system, the second image including out-of-focus blur which is defined by a point spread function stored in the memory; and
generating a restored image obtained by reducing camera-shake blur from the second image including the out-of-focus blur obtained by the image-capturing element by means of the image processing section using the point spread function which defines the out-of-focus blur to reduce the camera-shake blur from the image.

* * * * *